(12) United States Patent
Schiavon et al.

(10) Patent No.: US 10,011,913 B2
(45) Date of Patent: Jul. 3, 2018

(54) SUBSTRATE WITH A CORROSION RESISTANT COATING AND METHOD OF PRODUCTION THEREOF

(75) Inventors: Gianluigi Schiavon, Mogliano Veneto (IT); Diego Dal Zilio, Quinto di Treviso (IT)

(73) Assignee: Coventya S.p.A., Carugo (IT)

( * ) Notice: Subject to any disclaimer, the term of this patent is extended or adjusted under 35 U.S.C. 154(b) by 127 days.

(21) Appl. No.: 13/996,671

(22) PCT Filed: Dec. 23, 2011

(86) PCT No.: PCT/EP2011/006547
§ 371 (c)(1),
(2), (4) Date: Oct. 15, 2013

(87) PCT Pub. No.: WO2012/084262
PCT Pub. Date: Jun. 28, 2012

(65) Prior Publication Data
US 2014/0127532 A1    May 8, 2014

(30) Foreign Application Priority Data

Dec. 23, 2010  (DE) .......................... 10 2010 055 968

(51) Int. Cl.
*C25D 5/14* (2006.01)
*B32B 15/01* (2006.01)

(52) U.S. Cl.
CPC ............... *C25D 5/14* (2013.01); *B32B 15/01* (2013.01); *Y10T 428/12854* (2015.01)

(58) Field of Classification Search
None
See application file for complete search history.

(56) References Cited

U.S. PATENT DOCUMENTS

| | | | |
|---|---|---|---|
| 3,009,238 A | 11/1961 | Wesley et al. | |
| 3,268,424 A | 8/1966 | Brown et al. | |
| 3,563,864 A | 2/1971 | Du Rose et al. | |
| 3,887,444 A | 6/1975 | Fueki et al. | |
| 3,926,569 A | 12/1975 | Hage | |
| 4,429,020 A | 1/1984 | Luch | |
| 4,501,802 A | 2/1985 | Higuchi et al. | |
| 4,608,130 A * | 8/1986 | Shimizu et al. | ............... 205/154 |

(Continued)

FOREIGN PATENT DOCUMENTS

| | | |
|---|---|---|
| CN | 101063218 | 10/2007 |
| CN | 101162778 | 4/2008 |

(Continued)

OTHER PUBLICATIONS

JP49031413B Human Translation. Aug. 21, 1974.*

(Continued)

*Primary Examiner* — Vera Katz
(74) *Attorney, Agent, or Firm* — Schwegman Lundberg & Woessner, P.A.

(57) ABSTRACT

The invention relates to a substrate with a corrosion resistant coating comprising at least one nickel layer and at least one chromium layer as finish. Between these layers, at least one tin-nickel alloy layer is deposited for suppression of corrosion reactions determined by CASS and Russian mud tests. The invention relates also to a method for producing such substrates with corrosion resistant coating.

20 Claims, 5 Drawing Sheets

(56) References Cited

U.S. PATENT DOCUMENTS

| | | | |
|---|---|---|---|
| 2001/0038922 A1* | 11/2001 | Jonte et al. | 428/623 |
| 2002/0150797 A1* | 10/2002 | Jonte et al. | 428/698 |
| 2002/0168539 A1* | 11/2002 | Jonte et al. | 428/633 |
| 2005/0178668 A1 | 8/2005 | Mobius et al. | |
| 2005/0214542 A1 | 9/2005 | Nakamura et al. | |
| 2008/0206580 A1 | 8/2008 | Chen | |

FOREIGN PATENT DOCUMENTS

| | | | |
|---|---|---|---|
| CN | 101831679 | 9/2010 | |
| DE | 10354760 A1 | 6/2005 | |
| EP | 0058044 A1 | 8/1982 | |
| EP | 1006215 A1 | 6/2000 | |
| EP | 1343924 A2 | 9/2003 | |
| GB | 1455580 | 11/1976 | |
| JP | 49-031413 | 8/1974 | |
| JP | 49-130332 A | 12/1974 | |
| JP | 52-065138 | 5/1977 | |
| JP | 60-024395 A | 2/1985 | |
| JP | 60024395 | 2/1985 | |
| JP | 2001323392 A | 11/2001 | |
| JP | 2003027277 A | 1/2003 | |
| KR | 1020100075888 A | 7/2010 | |
| WO | WO-2002/083968 A2 | 10/2002 | |
| WO | WO 2009028182 A2 * | 3/2009 | C25D 3/06 |
| WO | WO-2012/084262 A1 | 6/2012 | |

OTHER PUBLICATIONS

"International Application PCT/EP2011/006547, International Search Report and Written Opinion dated Mar. 9, 2012", (Mar. 9, 2012), 11 pgs.

"Canadian Application Serial No. 2,822,476, Office Action dated Mar. 12, 2015", 4 pgs.

"International Application PCT/EP2011/006547, International Preliminary Report on Patentability dated Jun. 25, 2013", 7 pgs.

"Japanese Application No. 2013-545115, Office Action dated Apr. 22, 2015", (Apr. 22, 2015), 7 pgs.

"Japanese Application Serial No. 2013-545115, Decision of Refusal dated Nov. 4, 2015", 4 pgs.

"Japanese Application Serial No. 2013-545115, Dismissal of Amendment dated Nov. 4, 2015", (w/ English Translation), 6 pgs.

"Canadian Application Serial No. 2,822,476, Office Action dated Dec. 1, 2015", 3 pgs.

"Partial English Translation of JP 49-031413, published Aug. 21, 1974", 3 pgs.

"Chinese Application No. 201180061874.2, Second Office Action dated Jan. 8, 2016", (Jan. 8, 2016), 16 pgs.

"Chinese Application No. 201180061874.2, Supplementary Search Report dated Dec. 30, 2015", (Dec. 30, 2015), 4 pgs.

"Mexican Application No. MX/a/2013/007284, Office Action dated Mar. 22, 2017", w/ English Translation, (Mar. 22, 2017), 7 pgs.

"Mexican Office Action mxa2013007284 dated Sep. 4, 2017", w/English Translation, 8 pgs.

"Korean Application No. 10-2013-7016089, Office Action dated Aug. 2, 2017", w/ English Translation, (Aug. 2, 2017), 10 pgs.

"Korean Application No. 10-2013-7016089, Office Action dated Apr. 19, 2018", w/ English Translation, (Apr. 19, 2018), 8 pgs.

"Indian Application Serial No. 5579/DELNP/2013, Office Action dated Mar. 22, 2018", w/ English Translation, (Mar. 22, 2018), 6 pgs.

* cited by examiner

Fig. 1

| chromium layer |
| (chromium(III)- or chromium(VI)-layer) |
| tin-nickel |
| bright nickel |
| semi-bright nickel |
| copper |
| metallisation |
| plastics (ABS, ABS-PC, PP, PA) |

| chromium layer |
| (chromium(III)- or chromium(VI)-layer) |
| tin-nickel |
| bright nickel |
| Copper |
| Metallisation |
| plastics (ABS, ABS-PC, PP, PA) |

| chromium layer |
| (chromium(III)- or chromium(VI)-layer) |
| Tin-nickel |
| bright nickel |
| semi-bright nickel (possible) |
| copper (possible) |
| Brass |

| chromium layer |
| (chromium(III)- or chromium(VI)-layer) |
| tin-nickel |
| bright nickel |
| semi-bright nickel (possible) |
| copper (possible) |
| aluminium alloy |

| chromium layer |
| (chromium(III)- or chromium(VI)-layer) |
| tin-nickel |
| bright nickel |
| semi-bright nickel |
| Copper |
| Steel |

| chromium layer |
| (chromium(III)- or chromium(VI)-layer) |
| tin-nickel |
| bright nickel |
| semi-bright nickel (possible) |
| Copper |
| zinc-diecast |

SUBSTRATE WITH A CORROSION RESISTANT COATING AND METHOD OF PRODUCTION THEREOF

PRIORITY CLAIM TO RELATED APPLICATIONS

This application is a national stage application under 35 U.S.C. § 371 of PCT/EP2011/006547, filed 23 Dec. 2011, and published as WO 2012/084262 A1 on 28 Jun. 2012, which claims priority to German Application No. 10 2010 055 968.7, filed 23 Dec. 2010, which applications and publication are incorporated by reference as if reproduced herein and made a part hereof in their entirety, and the benefit of priority of each of which is claimed herein.

TECHNICAL FIELD

The invention relates to a substrate with a corrosion resistant coating which comprises at least one nickel layer and, as finish, at least one chromium layer. Between these layers, a tin-nickel alloy layer is deposited for suppression of corrosion reactions. The invention also relates to a method of production of such substrates with corrosion resistant coating.

By means of the present invention, the corrosion resistance of articles having a metal finish on a chromium basis is considerably increased.

BACKGROUND OF THE INVENTION

In the state of the art, different methods are known which lead to an increase in corrosion resistance of articles having a chromium coating as decorative finish. Such items can be plastic parts, brass articles, aluminum alloys and zinc die cast parts or also steel bodies. These parts having a chromium coating are applied in many areas, in particular in sanitary facilities, automotive and aerospace.

Electrolytic chromium and nickel depositions are generally chosen for realizing of a high corrosion resistance. In this regard, the nickel layer is divided in three different types. The first type is known as semi-bright nickel layer or sulfur-free layer, because it is a semi-bright layer having a sulfur content <0.005 weight-%. These layers have a higher electrochemical potential than bright nickel layers.

On top of the semi-bright nickel layer, a bright nickel layer is regularly electroplated. This leads to a bright appearance of the coated articles. These layers have a sulfur content of more than 0.03 weight-%.

The last nickel layer is a layer which has small disruptions on a micro-scale. This layer can comprise micro-particles or organic additives and can be coated with a chromium layer which has a micro-porous layer or a layer with micro cracks. These layers are usually nobler than bright nickel layers i.e. their potential is higher than that of bright nickel layers. Such coatings are known from U.S. Pat. No. 3,268,424 and U.S. Pat. No. 3,563,864. In these applications, the main aim is to decrease galvanic corrosion between chromium and nickel. The chromium layer is thereby electroplated as finish with an electrolyte comprising hexavalent chromium.

A further process is known which increases corrosion protection of the above-mentioned parts described before which are electroplated. In this regard, EP 1 343 924 B1 discloses a layer of silver or silver alloy which is located between the chromium and nickel layer. It is a problem that very toxic cyanide salts are used in the process which represent a serious threat for health and safety and are therefore no longer acceptable with regard to environmental aspects. Furthermore, silver as noble metal demonstrates two important disadvantages which are the high cost as well as the significant difference of the electrochemical potential in comparison to a bright nickel layer.

Different electrolytes based on trivalent chromium have been developed for the deposition of chromium layers over the years to prevent the use of environmentally precarious hexavalent chromium. Such processes are disclosed in EP 0 058 044 and GB 1 455 580. Trivalent chromium electrolytes have been used for years as decorative coatings, but show the disadvantage that they do not demonstrate sufficient corrosion resistance because it is not a pure chromium layer, but a special alloy comprising constituents of chromium, carbon, iron, sulfur, oxygen and nitrogen and thus have structural features different to pure chromium. Commonly, the UNI EN ISO 9227 CASS standard procedure (so-called CASS test) is applied for the investigation of the corrosion resistance of coated parts. In this test, the corrosion resistance (in hours) is measured in a room filled with salt spray at 50° C., wherein the salt consists of a sodium chloride solution which comprises copper ions with acetic acid (pH 3).

In recent years, a new test procedure has been introduced in the automotive industry to solve the problem that calcium chloride is used as antifreeze on frozen streets in northern countries. It turned out that calcium chloride reacts very aggressively with chromium covered parts. This is the reason why identical tests were introduced by e.g. Volkswagen (VW PV1067) and Nissan (NES M4063) (so-called "Russian Mud test"), in which the resistance of chrome deposited parts can be determined by using calcium chloride in the corrosion test.

SUMMARY

Starting herefrom, it was the object of the present invention to provide a method in which the corrosion protection of articles with a chromium finish can be improved compared to systems known from the prior art. At the same time, the method should be easily applicable.

The problem is solved by the substrate with corrosion resistant coating with the features of claim 1 and the method for production of said substrates with the features of claim 10. The further dependent claims reveal advantageous embodiments thereof.

According to the invention, a substrate with a corrosion resistant coating is provided which comprises at least one nickel layer and at least one chromium layer as finish. Between a nickel layer and a proximate chromium layer, at least one tin-nickel alloy layer is deposited for the suppression of corrosion reactions.

In the context of the present invention a suppression of corrosion reactions also means an essential or significant reduction of corrosion reactions.

The inventive idea for increasing corrosion resistance is based on replacing the prior art nickel layer having micro-scale disruptions with a tin-nickel alloy layer. This tin-nickel alloy layer enables the use of a variety of chromium-containing electrolytes for galvanic deposition of a chromium finish. Tin-nickel alloys with an increased amount of tin have good corrosion resistance and are often used as coating for prevention of surface clouding.

According to the invention it is provided that the corrosion rate between nickel and chromium layers during the corrosion test UNI EN ISO 9227 NSS or UNI EN ISO 9227 CASS (so-called CASS test) can be reduced. The present invention allows that corrosion, which arises due to the use of antifreeze and particularly affects automotive components which are exposed to the weather during winter, can be drastically reduced. Hence, significantly improved results could be achieved in the mentioned standard tests of VW (VW PV1067) and Nissan (NES M4063) compared to methods for corrosion protection known in the prior art.

According to the invention the tin-nickel alloy layer comprises preferably 55 to 75 weight-%, more preferably 60 to 70 weight-% and most preferably 64 to 68 weight-% tin and preferably 45 to 25 weight-%, more preferably 40 to 30 weight-% and most preferably 36 to 32 weight-% nickel. A layer of this alloy has a grey-pink color, as it is known from the ISO 2179:1986 standard.

The tin-nickel alloy layer preferably has a thickness in the range of 0.1 µm to 10 µm, more preferably 0.2 µm to 6 µm and most preferably 0.5 µm to 5 µm.

The at least one nickel layer preferably has a thickness of 1 to 50 µm. The at least one chromium layer preferably has a thickness of 0.05 to 2 µm.

It is further preferred that the coating consists of a bright nickel layer which is deposited on the substrate or a further metallic layer as well as the tin-nickel alloy layer and the chromium layer. The further metallic layer herewith preferably consists of copper or essentially comprises copper. Furthermore, it is preferred that a further semi-bright nickel layer is arranged between the bright nickel layer and the substrate or the further metallic layer.

The inventive coating can be combined with almost any number of substrate materials. Among these are in particular substrates of a metal or a metal alloy, particularly steel, brass or an aluminum alloy. Similarly, zinc die cast elements can be provided with the inventive coating. Further materials are selected from the group consisting of plastics, in particular acrylnitril-butadien-styrol (ABS), acrylnitril-butadien-styrol/polycarbonate (ABS-PC), polypropylene (PP) or polyamide (PA).

According to the invention, also a method is provided for the production of a corrosion resistant coating for a substrate, wherein the following layers are electroplated on the substrate subsequently:
a) at least one nickel layer;
b) at least one layer of a tin-nickel alloy;
c) at least one chromium layer.

It is preferred that c) is one chromium layer which is an electroplated finish, i.e. the last electroplated layer of the corrosion resistant coating. This does not exclude that at least one further nonmetallic layer is deposited on the chromium finish, e.g. an organic or inorganic passivation or a sealing.

There are arbitrary variants for carrying out the method which lead to the desired result.

A first preferred variant provides that the at least one tin-nickel alloy layer is electroplated from an acidic aqueous electrolyte with a pH in the range of 2 to 6. The electrolyte comprises at least one tin salt and at least one nickel salt. Furthermore, the electrolyte can comprise fluorides or chlorides which act as activators of the nickel layer for an improved adhesion of the tin-nickel alloy layer on the nickel layer. Moreover, fluoroborates, methanesulfonate and sulfates can be comprised.

Another preferred variant provides that the at least one tin-nickel alloy layer is electroplated from an alkaline aqueous electrolyte, wherein the electrolyte comprises at least one tin salt and at least one nickel salt and the salts are particularly selected from the group consisting of sulfates, sulfamates, phosphates, pyrophosphate, glycine, and mixtures thereof.

Another preferred embodiment provides that the at least one tin-nickel alloy layer is electroplated from a neutral aqueous electrolyte, wherein the electrolyte comprises at least one tin salt and at least one nickel salt and the salts are particularly selected from the group consisting of sulfates, sulfamates, phosphates, pyrophosphate, glycine, and mixtures thereof.

A further preferred embodiment provides that the at least one tin-nickel alloy layer is electroplated from a cyanide-containing aqueous electrolyte, wherein the electrolyte comprises at least one tin salt and at least one nickel salt are particularly selected from the group consisting of sulfates, sulfamates, phosphates, pyrophosphate, glycine, and mixtures thereof.

The cyanide containing electrolyte can comprise the following further additives:
sodium stannate, potassium stannate, sodium cyanide, potassium cyanide, sodium hydroxide, potassium hydroxide, sodium carbonate, potassium carbonate;
sodium tartrate, potassium tartrate, sodium gluconate, and amphoteric, anionic or non-ionic surfactants.

The above-mentioned aqueous electrolytes for tin-nickel can comprise the following further additives:
tin methane sulfonate, tin pyrophosphate, tin sulfate, sodium stannate;
conducting salts, as sodium methane sulfonate, sodium pyrophosphate, potassium pyrophosphate, sodium sulfate, potassium sulfate, sodium carbonate, potassium carbonate, sodium phosphate, potassium phosphate;
complexing agents, preferably amines, polyamines, preferably selected from the group consisting of ethylenediamine, diethylenetriamine, triethylenetetramine, tetraethylenepentamine, aminoethylethanolamine, triethanolamine, diethanolamine, monoethanolamine, as well as their combinations with organic acids, preferably selected from the group consisting of citric acid, tartaric acid and lactic acid;
wetting agents, as amphoteric, anionic, cationic or non-ionic surfactants;
antioxidants, as hydrochinone or benz-catechin;
methane sulphonic acid, boric acid, malic acid, tartaric acid, gluconic acid, phosphonic acids, aminophosphonic acids and sodium or potassium salts thereof.

The tin salts used according to the invention are preferably selected from the group consisting of chlorides, fluorides, fluoroborates, sulfates, methane sulfonates and mixtures thereof and the nickel salt is preferably selected from the group consisting of chlorides, fluorides, fluoroborates, sulfates, sulfamates, pyrophosphates, methane sulfonates, and mixtures thereof.

Regarding the deposition of the chromium finish, preferably an electroplating from an acidic aqueous electrolyte is carried out, wherein the electrolyte comprises chromium (VI)-salts, in particular chromic acid. A further variant provides that the electroplating is carried out from an acidic aqueous electrolyte, wherein the electrolyte comprises chromium(III)-salts, in particular chromium(III)-sulfate or chromium(III)-chloride, which are preferred because of environmental aspects.

Regarding the elementary components, the chromium deposit can comprise 1 to 25 weight-% carbon, 1 to 30 weight-% oxygen, 0 to 10 weight-% sulfur, 0 to 10 weight-% nitrogen and 0 to 30 weight-% iron.

BRIEF DESCRIPTION OF THE SEVERAL VIEWS OF THE DRAWINGS

With reference to the following figures and subsequent examples, the subject matter according to the invention is intended to be explained in more detail without restricting said subject to the special embodiments shown therein.

FIG. 1 shows different combinations of the inventive substrate coating.

DETAILED DESCRIPTION

Examples

Figure 2:
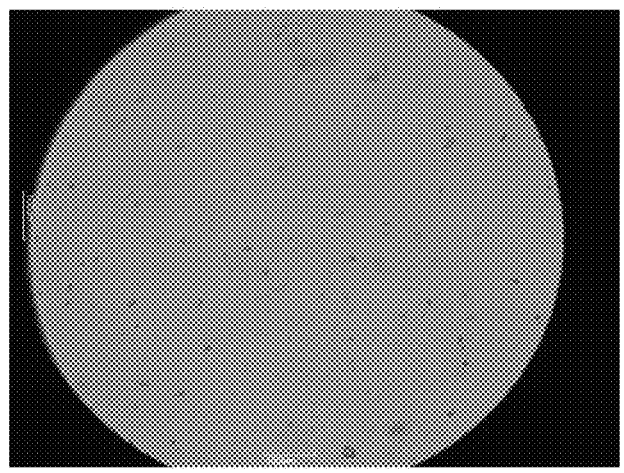
FIG. 2 shows a 100-fold magnification of a microscopic image of the surface produced according to example C (as it is known from the prior art) before carrying out the CASS test. Micropores are recognizable herein which are attributed to the nickel layer having micro-scale disruptions.
Figure 3:
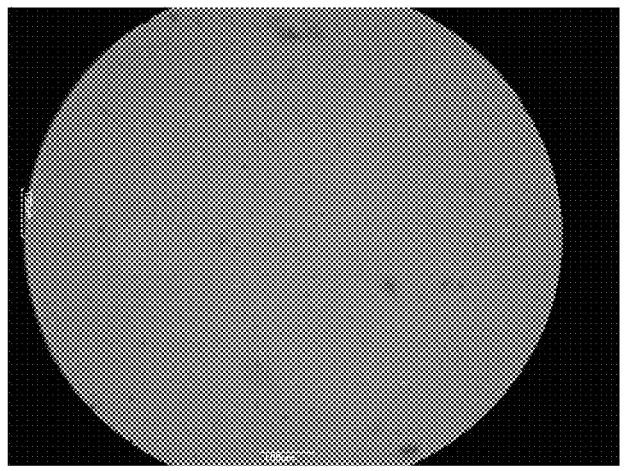
FIG. 3 shows a 100-fold magnification of a microscopic image of an inventive surface produced according to example D before performing the CASS test.
Figure 4:
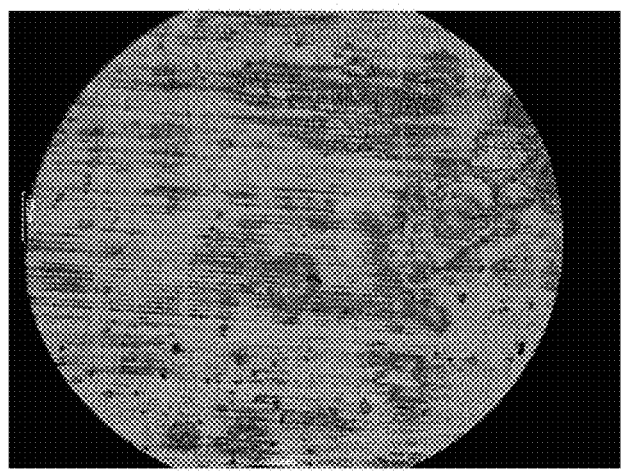
FIG. 4 shows a 100-fold magnification of a microscopic image of an inventive surface produced according to example C after 96 hours in the CASS test. The surface according to example C has strongly changed its appearance compared to the surface shown in FIG. 2, which indicates increased corrosion.
Figure 5:
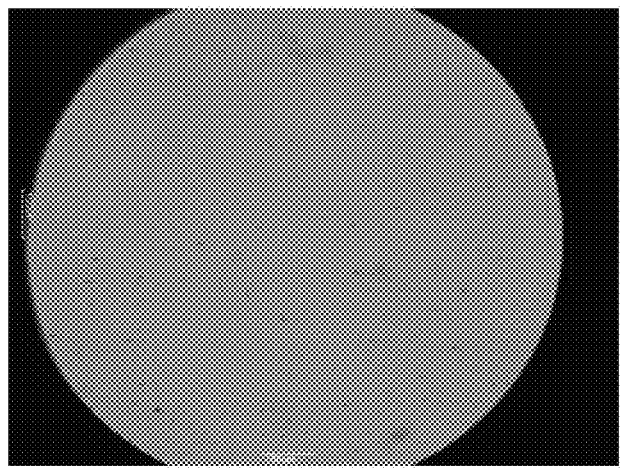
FIG. 5 shows a 100-fold magnification of a microscopic image of an inventive surface produced according to example D after 96 hours in the CASS test. The surface according to example D has changed its appearance only marginal in contrast to the surface produced according to example C which illustrates the drastically improved corrosion resistance of the inventive coatings compared to the coatings known in the prior art.

Formed parts of acrylonitrile-butadienestyrene (ABS) with a size of 5 to 7 cm were initially subjected to a preliminary processing to render the surface conductive for galvanic deposition.

Subsequently, a nickel layer having micro-scale disruptions was deposited according to the prior art (as it is known from U.S. Pat. No. 3,268,424) with the following composition and following parameters:

| | |
|---|---|
| $NiSO_4 * 6H_2O$ | 200-300 g/l |
| $NiCl_2 * 6H_2O$ | 20-80 g/l |
| $H_3BO_3$ | 30-80 g/l |
| kaolin (fine powder) | 0.1-1.5 g/l |
| pH | 3-5 |
| temperature | 40-60 ° C. |

These nickel-coated parts were used as comparison for the coatings according to the invention.

The coatings according to the invention were deposited from an electrolyte with the following composition and parameters:

| | |
|---|---|
| $NiCl_2 * 6H_2O$ | 200-300 g/l |
| $NH_4HF_2$ | 30-80 g/l |
| $SnCl_2 * 2H_2O$ | 20-60 g/l |
| pH | 2-5 |
| temperature | 40-60 ° C. |

In a further inventive embodiment, the coating was deposited from an electrolyte with the following composition and parameters:

| | |
|---|---|
| $NiCl_2 * 6H_2O$ | 200-300 g/l |
| $NH_4HF_2$ | 30-80 g/l |
| $SnCl_2 * 2H_2O$ | 20-60 g/l |
| Diethylenetriamine | 20-100 g/l |
| pH | 3.8-5.5 |
| Temperature | 40-60 ° C. |

Subsequently, the chromium finish was deposited.

An electrolyte with the following composition and parameters was used for the deposition of a chromium(VI)-layer:

| | |
|---|---|
| $CrO_3$ | 200-300 g/l |
| $H_2SO_4$ | 0.5-2 g/l |
| $F^-$ | 1-2 g/l |
| temperature | 30-40 ° C. |

Four different electrolytes were used for the deposition of a chromium(III)-layer. These electrolytes are distributed under the names TRISTAR 300, TRISTAR 300 AF, TRISTAR 700 and TRISTAR 720 by the company Coventya.

The TRISTAR 300 process is a chloride-based process and provides a white chromium layer wherein the electrolyte has the following composition and parameters:

| | |
|---|---|
| $Cr^{3+}$ | 15-25 g/l |
| organic acid | 25-250 g/l |
| Conducting salts | 150-300 g/l |
| pH | 2-6 |
| temperature | 25-35 ° C. |

The TRISTAR 700 process is comparable with the process described before wherein a chromium layer with a darker coloration results. The electrolyte used herein has the following composition and parameters:

| | |
|---|---|
| $Cr^{3+}$ | 15-25 g/l |
| organic acid | 25-50 g/l |
| conducting salts | 150-300 g/l |
| blackening agent | 1-10 g/l |
| pH | 2-3 |
| temperature | 25-35 ° C. |

The TRISTAR 300 AF process is a sulfate-based process and results in a chromium layer with white color. The electrolyte comprises the following composition and parameters:

| | |
|---|---|
| $Cr^{3+}$ | 5-15 g/l |
| organic acid | 5-20 g/l |
| conducting salts | 150-300 g/l |
| pH | 3-4 |
| temperature | 45-65 ° C. |

The TRISTAR 720 process is comparable to the TRISTAR 300 AF process, but results in a chromium layer with darker coloration. The electrolyte comprises the following composition and parameters:

| | |
|---|---|
| $Cr^{3+}$ | 5-15 g/l |
| organic acid | 5-20 g/l |
| conducting salts | 150-300 g/l |
| blackening agent | 2-10 g/l |
| pH | 3-4 |
| temperature | 45-65 °C. |

A first corrosion test according to UNI EN ISO 9227 CASS was carried out with such produced samples. The duration of the test was 24, 48, 72, 96 and 120 hours.

As a second corrosion test, the standard procedure VW PV1067 of Volkswagen AG and NES M4063 of Nissan, respectively, was applied. A muddy corrosion accelerator was produced including a mixture of a solution of 3 g Kaolin and 5 ml of an aqueous solution saturated with calcium chloride. Subsequently, a certain amount of mud was evenly distributed on the surface of the individual samples. The test samples were stored in a chamber at constant temperature and humidity (60° C. and 23% rel. air humidity). The duration of the test was 48 hours.

The evaluation of the above-described corrosion tests was carried out with an evaluation method which is similar to the evaluation method of ISO 10289 and performs an evaluation based on the size of the defective areas. This is illustrated in Table 1.

TABLE 1

| Defective areas A(%) | Quotation |
|---|---|
| no defects | 10 |
| 0 < A ≤ 0.1 | 9 |
| 0.1 < A ≤ 0.25 | 8 |
| 0.25 < A ≤ 0.5 | 7 |
| 0.5 < A ≤ 1.0 | 6 |
| 1.0 < A ≤ 2.5 | 5 |
| 2.5 < A ≤ 5 | 4 |
| 5 < A ≤ 10 | 3 |
| 10 < A ≤ 25 | 2 |
| 25 < A ≤ 50 | 1 |
| 50 < A | 0 |

In the first corrosion tests (CASS test), the respective samples were investigated after 24 hours of testing phase. They were cleaned and dried during each inspection without damaging the surface to ensure a correct evaluation. In this way, any changes to the appearance of the surface during the test, like e.g. spots, mattness, flaking, rust, or pitting, could be monitored.

The samples were evaluated during the second corrosion test with calcium chloride at the end of the test (after 48 hours). The samples were cleaned and dried without damaging the surface. Any change of the surface could be also monitored exactly.

In table 2, the individual samples are illustrated together with the test results. The samples A, C, E, G and I are those which represent the prior art. These samples comprise a nickel layer with micro-scale disruptions as intermediate layer between the bright nickel layer and the chromium finish.

Examples B, D and D', F, F', H, L and L' are coatings according to the invention and comprise a tin-nickel alloy layer between the bright nickel layer and the chromium finish.

As can be seen from table 2, sample B demonstrates a better corrosion resistance compared to sample A both in CASS test and CaCl2 test. Sample D and D' demonstrates a better corrosion resistance compared to sample C both in CASS test and CaCl2 test. Sample F and F' demonstrates a better corrosion resistance compared to sample E both in CASS test and CaCl2 test. Sample H demonstrates a better corrosion resistance compared to sample G both in CASS test and CaCl2 test. Sample L and L' demonstrates a better corrosion resistance compared to sample I both in CASS test and CaCl2 test.

Particularly the samples D, D', F and F' demonstrate excellent results and pass both the 96-hours CASS-test and the 48-hours VW PV1067 standard test. More particularly the sample D', F' showed the best corrosion resistance to CASS test passing both the 120 h.

TABLE 2

| Samples | micro-discontinuous noble Nickel | Tin-Nickel | Chromium | 24 h | 48 h | 72 h | 96 h | 120 h | CaCl₂ TEST |
|---|---|---|---|---|---|---|---|---|---|
| A | 2-5 μm | — | Hexavalent Chromium | 10 | 10 | 8 | 7 | 4 | 5 |
| B | — | 0.1-1.0 μm Sn65—Ni35 | Hexavalent Chromium | 10 | 10 | 9 | 8 | 7 | 6 |
| C | 2-5 μm | — | TRISTAR 300 | 4 | 3 | 3 | 2 | 2 | 9 |
| D | — | 0.1-1.0 μm Sn65—Ni35 | TRISTAR 300 | 10 | 10 | 10 | 10 | 8 | 10 |
| D' | — | 2.0-5.0 μm Sn65—Ni35 | TRISTAR 300 | 10 | 10 | 10 | 10 | 10 | 10 |
| E | 2-5 μm | — | TRISTAR 700 | 9 | 9 | 8 | 7 | 6 | 9 |
| F | — | 0.1-1.0 μm Sn65—Ni35 | TRISTAR 700 | 10 | 10 | 9 | 8 | 8 | 10 |
| F' | — | 2.0-5.0 μm Sn65—Ni35 | TRISTAR 700 | 10 | 10 | 10 | 10 | 9 | 10 |
| G | 2-5 μm | — | TRISTAR 300 AF | 10 | 9 | 8 | 8 | 6 | 5 |
| H | — | 0.1-1.0 μm Sn65—Ni35 | TRISTAR 300 AF | 10 | 10 | 10 | 9 | 8 | 6 |
| I | 2-5 μm | — | TRISTAR 720 | 9 | 9 | 8 | 7 | 5 | 5 |
| L | — | 0.1-1.0 μm Sn65—Ni35 | TRISTAR 720 | 10 | 10 | 9 | 8 | 8 | 6 |
| L' | — | 2.0-5.0 μm Sn65—Ni35 | TRISTAR 720 | 10 | 10 | 10 | 10 | 8 | 6 |

The invention claimed is:

1. A substrate with a corrosion-resistant coating, the corrosion-resistant coating comprising at least one nickel layer, a chromium layer as an outermost metal finish layer, and at least one tin-nickel alloy layer deposited between the at least one nickel layer and the chromium finish layer for suppression of corrosion reactions, wherein the chromium finish layer comprises chromium and from 1 to 25 wt. % carbon, from 1 to 30 wt. % oxygen, from 0 to 10 wt. % sulfur, from 0 to 10 wt. % nitrogen, and from 0 to 30 wt. % iron, wherein the at least one tin-nickel alloy layer is produced by deposition from an electrolyte having a temperature of from 40° C. to 60° C., and wherein the produced substrate passes a corrosion test according to UNI EN ISO 9227 CASS standard procedure for a test duration of at least 96 hours.

2. The substrate according to claim 1, wherein the at least one tin-nickel alloy layer comprises 55 to 75 weight-% tin and 25 to 45 weight % nickel.

3. The substrate according to claim 1, wherein the at least one tin-nickel alloy layer has a thickness of 0.1 to 10 μm.

4. The substrate according to claim 1, wherein the at least one nickel layer has a thickness of 1 to 50 μm.

5. The substrate according to claim 1, wherein the chromium finish layer has a thickness of 0.05 to 2 μm.

6. The substrate according to claim 1, wherein the corrosion-resistant coating comprises a bright nickel layer or a further metallic layer deposited on the substrate.

7. The substrate according to claim 6, wherein the further metallic layer consists essentially of copper.

8. The substrate according to claim 6, further comprising a semi-bright nickel layer arranged between the bright nickel layer and the substrate or the further metallic layer.

9. The substrate according to claim 1, wherein the substrate comprises a metal, a metal alloy, or a plastic.

10. The substrate according to claim 1, wherein the produced substrate passes a corrosion test according to Volkswagen VW PV1067 standard procedure for a test duration of at least 48 hours.

11. A method for producing a corrosion resistant coating for a substrate, the method comprising:
   a) electroplating at least one nickel layer on the substrate,
   b) electroplating at least one tin-nickel alloy layer from an electrolyte having a temperature of from 40° C. to 60° C., and
   c) electroplating a chromium layer as an outermost metal finish layer, wherein electroplating the chromium layer comprises electro-plating chromium that includes from 1 to 25 wt. % carbon, from 1 to 30 wt. % oxygen, from 0 to 10 wt. % sulfur, from 0 to 10 wt. % nitrogen, and from 0 to 30 wt. % iron, so that the at least one tin-nickel alloy layer is deposited between the at least one nickel layer and the at least one chromium finish layer,
   wherein corrosion reactions are suppressed by the tin-nickel alloy layer such that the produced substrate passes a corrosion test according to UNI EN ISO 9227 CASS standard procedure for a test duration of at least 96 hours.

12. The method according to claim 11, wherein electroplating the at least one tin-nickel alloy layer comprises electroplating the at least one tin-nickel alloy layer from an acidic aqueous electrolyte with a pH in the range of 2 to 6, wherein the electrolyte comprises additives comprising at least one of chlorides, fluorides, fluoroborates apart from at least one tin salt and at least one nickel salt.

13. The method according to claim 12, wherein the electrolyte comprises second additives selected from the group consisting of complexing agents;
   wetting agents; and
   mixtures thereof.

14. The method according to claim 11, wherein electroplating the at least one tin-nickel alloy layer comprises electroplating the at least one tin-nickel alloy layer from an alkaline aqueous electrolyte, wherein the electrolyte comprises at least one tin salt and at least one nickel salt, wherein the salts are selected from the group consisting of sulfates, sulfamates, phosphates, pyrophosphates, glycine, and mixtures thereof.

15. The method according to claim 11, wherein electroplating the at least one tin-nickel alloy layer comprises electroplating the at least one tin-nickel alloy layer from a cyanide-containing aqueous electrolyte, wherein the electrolyte comprises at least one tin salt and at least one nickel salt, wherein the salts are selected from the group consisting of sulfates, sulfamates, phosphates, pyrophosphates, glycine, and mixtures thereof.

16. The method according to claim 11, wherein electroplating the at least one tin-nickel alloy layer comprises electroplating the at least one tin-nickel alloy layer from a neutral or weakly alkaline aqueous electrolyte with a pH in the range of 6 to 10, wherein the electrolyte comprises at least one tin salt and at least one nickel salt, wherein the salts are selected from the group consisting of sulfates, sulfamates, phosphates, pyrophosphates, glycine, and mixtures thereof.

17. The method according to claim 11, wherein the tin salt is selected from the group consisting of chlorides, fluorides, fluoroborates, sulfates, methane sulfonates and mixtures thereof, and the nickel salt is selected from the group consisting of chlorides, fluorides, fluoroborates, sulfates, sulfamates, pyrophosphates, methane sulfonates, and mixtures thereof.

18. The method according to claim 11, wherein electroplating the chromium finish layer comprises electroplating the chromium layer from an acidic aqueous electrolyte, wherein the electrolyte comprises at least one chromium (VI)-salt.

19. The method according to claim 11, wherein electroplating the chromium finish layer comprises electroplating the chromium layer from an acidic aqueous electrolyte with a pH in the range of 2 to 6, wherein the electrolyte comprises at least one chromium(III)-salt.

20. The method according to claim 19, wherein the electrolyte comprises additives selected from the group consisting of:
   organic acids or salts thereof;
   inorganic acids or salts thereof;
   conducting salts;
   blackening agents; and
   wetting agents.

* * * * *